United States Patent [19]

Furuyama

[11] Patent Number: 5,412,934
[45] Date of Patent: May 9, 1995

[54] BUSHED CHAIN WITH ROLLER FITTED ON OUTSIDE DIAMETER OF OIL-IMPREGNATED SINTERED BUSHING

[75] Inventor: Masaru Furuyama, Tokyo, Japan

[73] Assignee: Yamakyu Chain Kabushiki Kaisha, Tokyo, Japan

[21] Appl. No.: 218,311

[22] Filed: Mar. 25, 1994

Related U.S. Application Data

[63] Continuation-in-part of Ser. No. 106,876, Aug. 16, 1993, abandoned.

[30] Foreign Application Priority Data

Aug. 17, 1992 [JP] Japan ................................. 4-57512

[51] Int. Cl.6 ............................................. F16G 13/08
[52] U.S. Cl. ................................. 59/78; 59/4; 474/206; 474/231
[58] Field of Search .................. 59/4, 5, 6, 8, 78; 474/206, 231

[56] References Cited

U.S. PATENT DOCUMENTS

| | | | |
|---|---|---|---|
| 2,983,158 | 5/1961 | Hodlewsky | 59/8 |
| 4,615,171 | 10/1986 | Burk | 59/78 |
| 4,795,408 | 1/1989 | Kotegawa et al. | 474/209 |
| 4,995,852 | 2/1991 | Takahashi et al. | 474/91 |

FOREIGN PATENT DOCUMENTS 0008847 1/1983 Japan ................................. 59/4

*Primary Examiner*—David Jones
*Attorney, Agent, or Firm*—Kane, Dalsimer, Sullivan, Kurucz, Levy, Eisele and Richard

[57] ABSTRACT

To provide a roller chain according to the present device pertaining to a bushed chain with an oil-impregnated sintered bushing fitted on a roller, which has an improved roller retaining power required during the sliding of the roller chain, and further requires no installation time and labor at the time of unlinking and linking of the roller chain, thereby preventing impairing or breaking each member. Pin diameter is increased to lower a bearing surface pressure to thereby improve wear resistance. Furthermore, the thickness of the sintered bushing axially supported on a pin is made nearly equal to that of the roller. According to the present device, the chain provided is a bushed chain with an oil-impregnated sintered bushing fitted on a roller, in which the working accuracy of the punched surface of a link plate has been improved, requiring no staking of a pin end face after installation.

3 Claims, 2 Drawing Sheets

BUSHED CHAIN WITH ROLLER FITTED ON OUTSIDE DIAMETER OF OIL-IMPREGNATED SINTERED BUSHING

This application is a continuation-in-part application of U.S. patent application Ser. No. 08/106,876, filed on Aug. 16, 1993, now abandoned.

BACKGROUND OF THE INVENTION

1. Field of the Invention

The present device relates to a bushed chain with rollers each fitted on the outside diameter of an oil-impregnated sintered bushing and, more particularly, to a bushed chain having rollers each fitted on the outside diameter of an oil-impregnated sintered bushing that chain life can be prolonged by decreasing a bearing surface pressure (pin outside diameter to bushing diameter) by increasing the pin outside diameter as compared with a proportion between component members of a standard chain.

2. Description of the Prior Art

Regarding a roller chain in conventional use, it has been a common practice to use a sintered oil-impregnated bushing for lubricating each chain-member bearing area and roller outside diameter where sprocket teeth contact when oil lubrication from outside is difficult or is not straightforward, thereby providing a self-lubricating mechanism. The efficacy and life of this self-lubrication mechanism is determined by the density of the sintered body and mechanical features such as mechanical strength, shock-resistance, elongation and fatigue strength. The volume of oil contained is determined with the volume of pores in sintered body, and the sintered density, if decreased, increases the oil content, providing the bushing with good lubricating properties but decreases the mechanical strength and toughness. Likewise, increasing the sintered density, increases the mechanical strength but decreases the oil content and decreases the lubrication quality and life.

From this point of view, attempts have been made such as the setting of a sintered density of sintered bushing low to contain more oil but not to decrease mechanical strength, or on the contrary set density of bushing high to obtain the high mechanical strength but sacrificing some portion of oil volume impregnated. Other attempts having included increasing the dimensions of the bushing to more than that of the common bushing as much as the roller dimensions reduced from the common chain rollers in order to increase the volume of the bushing to increase the volume of oil impregnated therein.

It is, however, impossible to simultaneously satisfy these characteristics which run counter to each other, and accordingly some consideration has to be incorporated in the design of each member for the purpose of maintaining these characteristics to some degree.

Meanwhile, from another point of view, it becomes necessary to prevent damaging the members at the time of installation of the entire roller chain. Namely, in the case of a small pin diameter, an outer link plate is fitted on the pin and "staking" the end of this pin is effected to prevent the accidental removal of this outer link plate. The pin diameter is increased larger than the bushing inside diameter by the "staking" and therefore is likely to impair the inner surface of the sintered bushing when the bushing is installed on the pin, sometimes breaking the bushing itself. Also, it is known to grind off the "staked" part by using a grinder prior to the linking of the chain. This method, however, will deteriorate characteristics of oil impregnated in the sintered bushing due to heat generated at the time of grinding, resulting in oil leakage and consequently in a decreased life of the chain itself.

Furthermore, when the pin outside diameter is small, an increased bearing surface pressure will result in decreasing or destroying wear resistance.

OBJECTS AND SUMMARY OF THE INVENTION

In view of the above-described disadvantages inherent in the heretofore known art, it is an object of the present device to provide a roller chain that has an improved roller holding strength for sliding and requires no extra time for chain installation at the time of assembling and disassembling of the roller chain, so that each member will be neither impaired nor broken.

That is, to prolong the life of the roller chain, therefore, the roller chain of the present device is designed to prevent damaging any member when the whole body of the roller chain is installed, and furthermore to prevent fracture of the bushing itself because the pin diameter, when small, will be increased larger than the bushing inside diameter by staking and will become likely to injure the inner surface of the sintered bushing at the time of installation of the pin and the sintered bushing.

Assembling and disassembling of the chain will become necessary after grinding off the staked part. In this case, characteristics of the oil impregnated in the sintered bushing will be deteriorated by heat generated by grinding, sometimes causing oil seepage thereby shortening the life of the chain itself. The present device is capable of obviating such a disadvantage.

In the case of a conventional chain, riveting is performed at both ends of the link pin for the purpose of tightly fixing the pin. Then both ends of the link pin are crushed and expanded sharply but partially. When the link pin is taken out of the bushing, these sharply expanded parts may damage the inside surface of the bushing.

It is therefore a further object of this invention to increase the abrasion resistance of a bushing by decreasing the pressure received on the surface of the bushing.

It is therefore a further object of this invention to increase the number of pores in a sintered bushing so as to increase the abrasion resistance of the bushing.

It is therefore a further object of this invention to eliminate the riveting of the link pin.

The present device has accomplished the mentioned object by making pin outside diameter larger in order to lower the bearing surface pressure and thereby to improve wear resistance, while volume sacrificed in bushing is very least by thickness on inside diameter, the small side of the diameters, and this inside diameter bigger than common shall help to gain better stomatal pores and as result longer and smoother lubrication. Furthermore, the thickness of the sintered bushing supported on the pin has been made approximately the same as that of the roller. The chain according to the present device uses link plates having an improved punched surface accuracy and therefore requires no staking at the pin end after installation.

BRIEF DESCRIPTION OF THE DRAWINGS

The present invention will become more fully understood from the detailed description given hereinbelow and the accompanying drawings which are given by way of illustration only, and thus are not limiting to the present invention, and wherein.

DETAILED DESCRIPTION OF THE PREFERRED EMBODIMENTS

Figure 1:
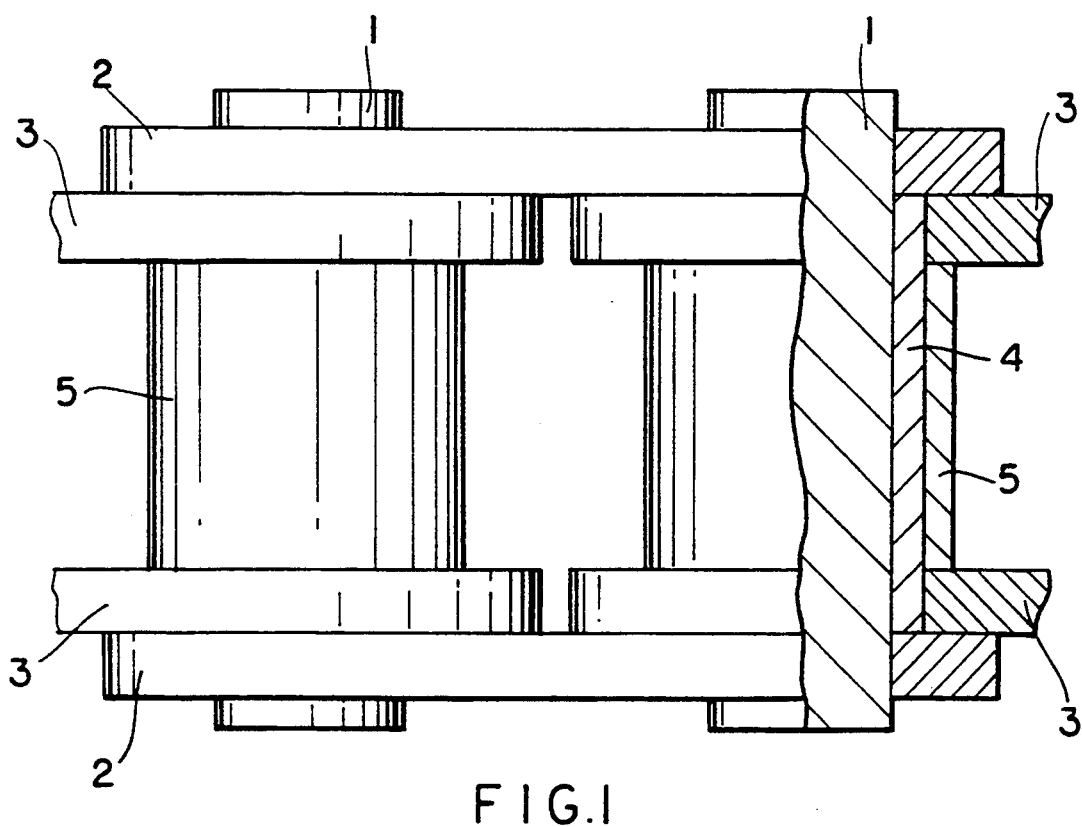
FIG. 1 is a partial view of a bushed chain, showing its major portion partly sectioned, with a roller fitted on the outside diameter of an oil-impregnated sintered bushing of a first embodiment of this invention.

Referring now to the drawings in detail wherein like numerals indicate like elements throughout the several views, one sees that FIG. 1 shows a first embodiment of the present device, wherein a bushed pin comprises a chain link pin 1, an outer link plate 2 in which the pin end is force-fitted, an oil-impregnated sintered bushing 4 rotatably supported on the link pin 1, and a roller 5 further supported on the bushing 4.

According to the present device, the outside diameter of the link pin 1 has been increased 6 to 20 percent larger as compared with the link pin of a standard chain; this increase in the link pin diameter decreases the bearing surface pressure more than that of the standard chain, thereby improving wear resistance and prolonging chain life. That is, the bearing surface pressure is expressed by $$\sigma = \frac{P}{d \times L}$$

where $\sigma$: Bearing surface pressure
P: Load
d: Pin outside diameter
L: Bushing length Provided that the load remain unchanged, the bearing surface pressure ($\sigma$) is reduced by increasing the pin outside diameter (d) and the bushing length (L), and accordingly the amount of wear of the pin outside diameter decreases.

In the meantime, the sintered bushing 4 rotatably fitted on the outside diameter of the link pin 1 has a hardened surface layer obtained by carburizing and hardening the surface of a bushing body which has been sintered to a specific shape. This surface hardening, together with the impregnation of the sintered body with oil, has increased not only the lubricating function but also the mechanical strength of the bushing surface, consequently improving its wear resistance. Provided, therefore, that the sintered bushing 4 has the same function, when compared in the respect of wear resistance, as a sintered bushing not subjected to surface-hardening treatments, the thickness of the surface-hardened sintered bushing can be reduced more than that of the standard chain. For example, in the case of a bushed chain of A type, the roller thickness is 0.675 mm and the bushing thickness is 0,875 mm. In the bushed chain of B type, both the former and the latter are 0,975 mm. The use of a long or large chain likely to be caused by an increase in the pin diameter can be avoided by decreasing the diameter of the sintered bushing as compared with the standard chain, and also the bushed chain can have the same functional properties as the standard chain on the whole.

Figure 2:
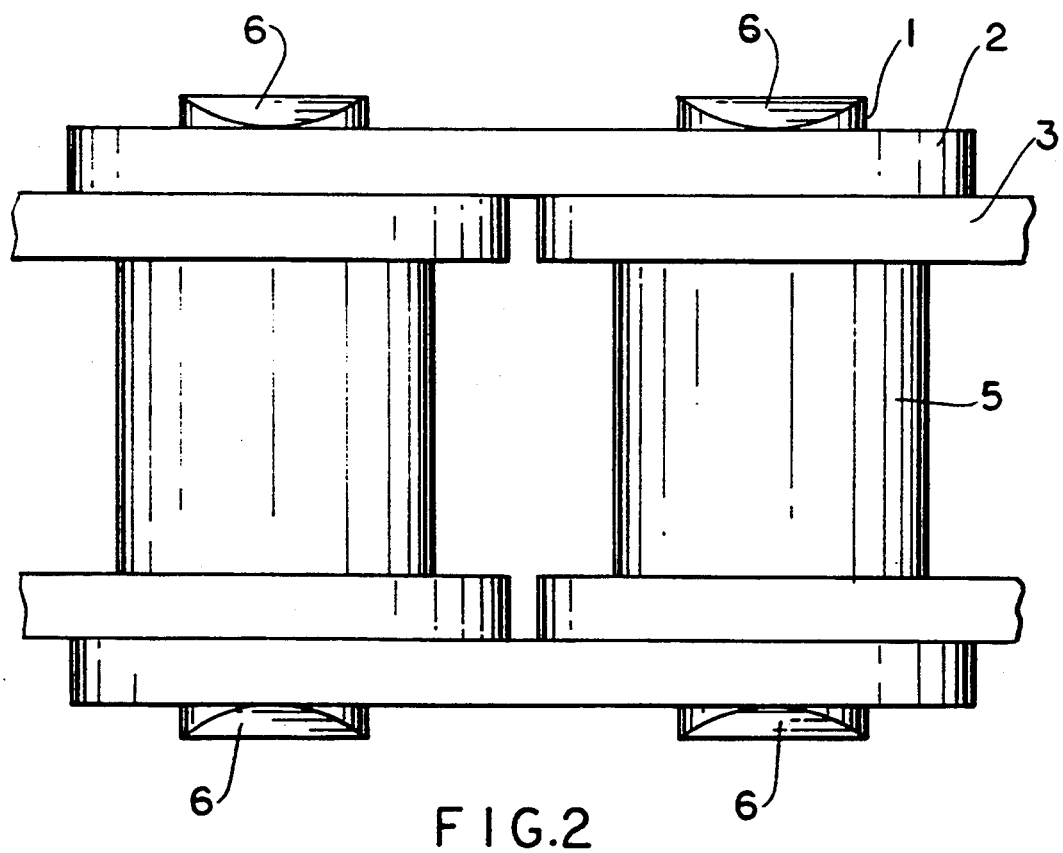
FIG. 2 is a front view of a prior-art oil-impregnated sintered bushed chain.

Next, for a punched surface of the outer and inner link plates 2, 3 a working accuracy can be improved by increasing the outside diameter of the link pin previously stated; therefore the "staking" 6 will be unnecessary for fastening the link pin shown in FIG. 2 to the outer and inner link plates 2, 3. That is, when the link pin to be fastened to the outer and inner link plates 2, 3 in the bushed chain is of a small diameter, a linking means such as a snap ring (not illustrated) for connecting the link pin will be required. In the case of a large pin diameter, however, punching the link plate 2 or 3 can be done with 80 percent or more working accuracy in relation to the plate thickness, thus gaining a better link plate retaining function than the prior art having an approximately 60 percent of working accuracy. Therefore no staking process is needed for fastening the pin end after the installation of the chain.

It is, therefore, possible to obviate various disadvantages described above resulting from the "staking" of the pin end. Particularly the "staking" operation at the time of chain assembling and disassembling can be dispensed with, and accordingly a damage likely to be caused by the "staking" itself to the bushing inner surface and the deterioration of impregnated oil characteristics caused by heat generated by grinding off a staked part can be prevented. In a bushed chain with a roller fitted on the outside diameter of the oil-impregnated sintered bushing according to the present device, as heretofore explained, the pin outside diameter has been increased to lower the bearing surface pressure and to improve wear resistance. Furthermore, the thickness of the sintered bushing axially supported on the pin has been made nearly equal to that of the roller. According to the present device it is possible to provide a roller chain with an improved working accuracy of a punched surface which requires no staking of the pin end after installation, thereby providing an improved roller retaining power required when the roller chain slides. Furthermore, no installation time and labor are needed at the time of roller chain linking and unlinking, thus preventing damage to each member.

Figure 3:
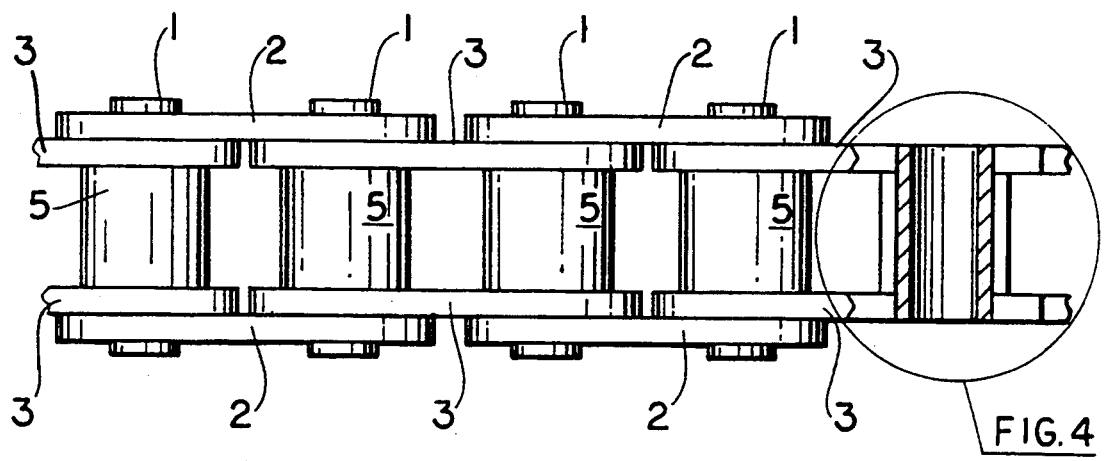
FIG. 3 is a side plan view of a second embodiment of this invention, partly in cross section, of a bushed chain, with a roller fitted on the outside diameter of an oil-impregnated sintered bushing.
Figure 4:
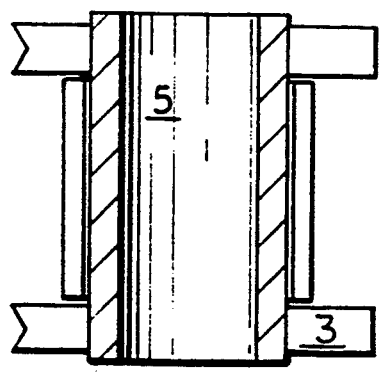
FIG. 4 is a cross-sectional view of the second embodiment of this invention along plane 4—4 in FIG. 3.
Figure 5:
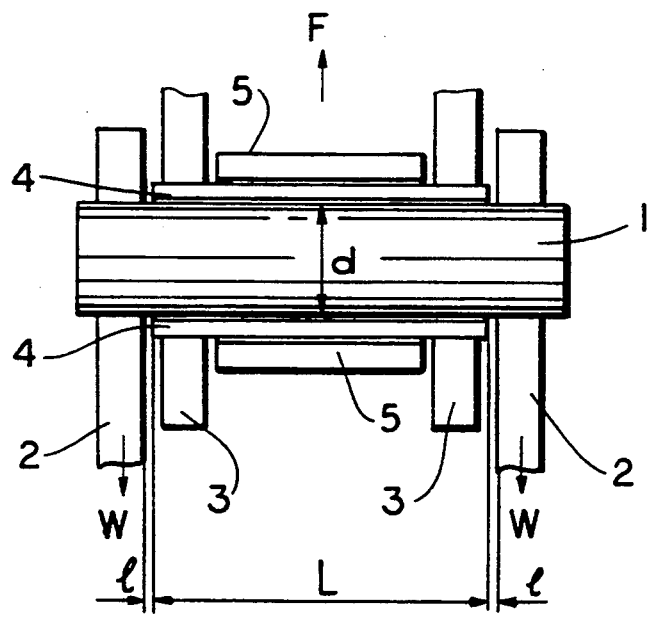
FIG. 5 is an illustration of the dimensions of and forces on one of the links of the second embodiment of this invention of FIG. 3.
Figure 5:
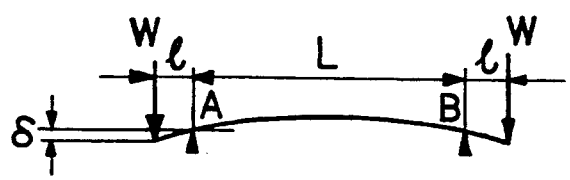

A second embodiment of the invention is shown in FIGS. 3 through 5, with elements substantially corresponding to those shown in FIG. 1. The stake 6, however, is eliminated.

The "standard" sizes and proportions of the various components are defined in the Public Industrial Standard (for example, JIS). As the diameter of a roller 5 is defined in the Public Industrial Standard, when the diameter of a link pin 1 is designed one size (1.06 to 1.2 times) larger than the size defined in said standard, the thickness ratio of the bushing and the roller are therefore in the range of 1:1.03 to 1:1.09, reducing the wall thickness of the roller.

To increase the abrasion resistance of the bushing, the pressure received on the surface of the bushing is reduced. The pressure received on a unit surface of a bushing is calculated as follows:

$$P = \frac{F}{L \times d}$$

where, as illustrated in FIG. 5
P=Pressure
F=Load or force received on the chain (Kg$_f$)
L=Entire length of the bushing (mm)
d=diameter of the link pin (mm)

As can be seen from the above equation, if the value of the load on a chain is constant, the pressure received on the surface of a bushing decreases with increasing bushing length and/or the diameter of pin 1. It is clear that abrasion decreases with decreasing surface pressure.

As can be further seen from the FIGS. 3–5, both ends of the bushing project from the surface of the inner link plate 3. For example, if the entire length of the bushing is 18.5 mm, the length of the projection is in the range of 0.3 to 0.5 mm. According to the above construction, the link pin 1 bends only slightly when load is added thereto. Since the link pin 1 and the bushing keep ideal linear contact, abrasion resistivity is increased.

Referring to the drawings herein, particularly FIGS. 4 and 5, when the force F is applied to the chain, component forces W are added to the link pin 1. Then the link pin 1 bends and the amount of deflection ($\delta$) is calculated by the following equation.

$$\delta = \frac{Wl^2}{3EI}\left(l + \frac{3L}{2}\right) \text{mm.}$$

where W=load added to link pin (kg$_f$)
l=gap between the bushing and outer link plate (mm)
L=length of the bushing (mm)
E=Young's modulus (kg$_f$/mm$^2$)
I=second moment of area=$\pi d^4/64$ (mm$^4$)
d=diameter of the link pin
Then the above equation is re-written as follows:

$$\delta = \frac{64 \, Wl^2}{3E\pi d^4}\left(l + \frac{3L}{2}\right) \text{mm.}$$

According to the embodiment of this chain, both ends of the bushing project from the surface of the respective inner link plate 3. However, a gap "1" is made small and a diameter of the link pin 1 is larger than the diameter defined in the Public Industrial Standard.

When the deflection ($\delta$) of the link pin 1 is calculated by the above equation, it is clear from basic mathematics that a sharp decrease in numerator and a sharp increase in the denominator cause the value of the deflection ($\delta$) to become minimized. As a result, since the link pin 1 and the bushing keep nearly ideal linear contact, abrasion resistivity is increased.

By increasing the diameter of the link pin 1, the setting area on the outer link plate 2 for the link pin 1 becomes large, and this causes the retaining force between the link pin 1 and the hole bared on the link plate 2 to increase. Such being the case, the riveting process carried out at both ends of the link pin 1 in the embodiment of FIG. 1 can be eliminated in the embodiment illustrated in FIGS. 3–5. Preferably, the material of the second embodiment of this invention is powdered sintered alloy, rather than steel. Therefore, the bushing breaks easily when it is scratched.

As described in the description of the prior art, the riveting of link pins may result in damage to the inside surface of the bushing. However, according to the second embodiment of the present invention, the retaining force may be increased sufficiently by increasing the diameter of a link pin at the setting area of the link pin without riveting, therefore the disadvantages of riveting are eliminated.

Additionally, the number of pores to retain the lubricant is increased to increase the abrasion resistance of the apparatus. When the diameter of the link pin 1 becomes large, the inside diameter of the bushing likewise becomes large. When the surface area where a link pin 1 and a bushing contacts becomes large, the available porous area (which is characteristic of a sintered alloy) increases thereby providing for increasing lubrication. Since the lubrication between the link pin 1 and the bushing spreads sufficiently, abrasion resistivity is thereby increased.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. A roller chain comprising, a link pin fixed to a pair of outer link plates therebetween, a sintered oil-retaining bushing fixed to a pair of inner link plates therebetween and fitted rotatably on an outer peripheral surface of said link pin, and a roller fitted rotatably on an outer peripheral surface of said bushing, wherein said link pin is fixed to a hole bored through the outer link plate without riveting at a top of said link pin; a surface of said bushing having a hardened surface layer; a diameter of said link pin being larger than a corresponding dimension defined in ANSI standard by 6 to 18 percent; wherein a wall thickness of said bushing and a wall thickness of said roller is substantially equal and wherein a sum of said wall thickness of said bushing and said wall thickness of said roller is thinner than a corresponding dimension defined in ANSI standard, and a diameter of the roller is substantially equal to a corresponding dimension defined in ANSI standard.

2. A roller chain as claimed in claim 1, wherein said hardened surface layer of said bushing is obtained by carburizing.

3. A roller chain as claimed in claim 1, wherein both ends of said bushing protrude from a surface of said inner link plate whereby said ends of the bushing do not touch an inner surface of the outer link plate.

* * * * *